(12) United States Patent
Thouin et al.

(10) Patent No.: US 7,089,131 B2
(45) Date of Patent: Aug. 8, 2006

(54) INSPECTION AND VERIFICATION SYSTEM AND METHOD

(75) Inventors: Mark E. Thouin, Woodstock, VA (US); Gary Wayne Funkhouser, Woodstock, VA (US)

(73) Assignee: Lear Corporation, Southfield, MI (US)

( * ) Notice: Subject to any disclaimer, the term of this patent is extended or adjusted under 35 U.S.C. 154(b) by 818 days.

(21) Appl. No.: 10/104,139

(22) Filed: Mar. 22, 2002

(65) Prior Publication Data

US 2003/0182009 A1     Sep. 25, 2003

(51) Int. Cl.
*G06F 19/00* (2006.01)
(52) U.S. Cl. .......................................... 702/82; 702/81
(58) Field of Classification Search ......... 702/128–129
See application file for complete search history.

(56) References Cited

U.S. PATENT DOCUMENTS

| | | | |
|---|---|---|---|
| 4,107,541 A | 8/1978 | Kirsch | |
| 4,661,917 A * | 4/1987 | Haze et al. | 700/305 |
| 4,987,726 A * | 1/1991 | Petho et al. | 53/510 |
| 5,161,954 A * | 11/1992 | Matheson et al. | 417/12 |
| 5,594,654 A * | 1/1997 | Shuman et al. | 700/213 |
| 5,703,784 A * | 12/1997 | Pearson | 700/223 |

FOREIGN PATENT DOCUMENTS

GB     2 273 191 A     6/1994

\* cited by examiner

*Primary Examiner*—John Barlow
*Assistant Examiner*—Jonathan Moffat
(74) *Attorney, Agent, or Firm*—Brooks Kushman P.C.

(57) ABSTRACT

An inspection and verification system includes an inspection fixture for inspecting a finished part prior to its placement in a shipping container. The inspection fixture signals a processor that the finished part has "passed" or "failed". A finished part that passes is placed in the shipping container, which is locked in a loading position on the weighing platform of an electronic scale. If the weight of the finished part does not match a standard finished part weight, the part is rejected, the shipping container is removed and quarantined, and a new shipping container is locked in the loading position. When the weight of the finished part matches the standard weight, the part is accepted and it remains in the shipping container. When the processor receives a number of "accept" signals equal to a standard shipping container quantity, it releases the shipping container.

24 Claims, 8 Drawing Sheets

INSPECTION AND VERIFICATION SYSTEM AND METHOD

BACKGROUND OF THE INVENTION

1. Field of the Invention

The present invention relates to an inspection and verification system and method for ensuring that finished parts pass inspection prior to shipment to a customer.

2. Background Art

Use of automated inspection systems—i.e., those that employ machines to do at least some of the inspecting—is well known. These systems may be isolated inspection stations, or they may be integrated into a manufacturing or assembly line. It is typically the goal of these systems to ensure that finished products meet certain standards. These standards may include dimensional tolerances, types of fits or finishes, or the presence of a required set of components. Despite the increasingly automated nature of these inspection systems, and despite their increasing level of sophistication, it is often still possible for a finished part to be shipped to a customer without first passing inspection.

One attempt to overcome this problem is disclosed in U.S. Pat. No. 4,107,541 issued to Kirsch on Aug. 15, 1978. Kirsch discloses an inspection device designed to verify the presence of holes in a workpiece. This device is integrated into an assembly line, such that if the required number of holes is not found in the workpiece, the inspection device sends a signal to a control system that prohibits the workpiece from being processed any further. All of the required holes must be present before the control system will allow the workpiece to continue down the line. Although it has the advantage of being integrated into the manufacturing process itself, the inspection device disclosed by Kirsch has limited applicability. First, it is designed to detect the presence of holes, and very often this will not be the type of inspection that is required. Moreover, the inspection device is used on a workpiece at an intermediate stage of manufacture. There is still no assurance that a completed, finished part will be inspected and pass that inspection prior to its shipment to the customer.

Another attempt to overcome this problem includes a method of prohibiting access to a shipping container until after the finished parts have passed inspection. The opening of the shipping container is covered by an electro-mechanically actuated sliding door. The door is connected to an inspection fixture such that it only opens after a finished part has passed inspection. The inspected part is removed from the inspection fixture, loaded into the shipping container, and the door closes until another finished part is placed in the inspection fixture and passes inspection. This is an imperfect solution however, in that once the door is open, many parts can be placed in the shipping container, even uninspected parts. Hence there remains a need for an inspection system that further ensures that every finished part passes inspection prior to shipment to the customer.

Accordingly, it is desirable to provide an inspection and verification system which overcomes the shortcomings of the above referenced prior art inspection systems, by helping to ensure that every finished part in a customer's order is inspected and passes that inspection prior to shipment to the customer.

SUMMARY OF THE INVENTION

One aspect of the invention provides an improved inspection and verification system that helps to ensure that finished parts are inspected, and that they pass that inspection, prior to being shipped to the customer.

Another aspect of the invention provides an improved inspection and verification system that helps to ensure that the correct number of finished parts are loaded in a shipping container prior to the container's shipment to the customer.

A further aspect of the invention provides an improved inspection and verification system that helps to ensure that finished parts that do not pass inspection are not included for shipment to the customer.

Accordingly, an inspection and verification system is provided that comprises a loading structure for receiving a finished part, and a processor capable of at least accessing finished part information and receiving and sending electronic signals. The system also provides an inspection fixture having at least a sensor for inspecting the finished part prior to the loading structure receiving it. The inspection fixture also sends electronic signals to the processor. A detection apparatus is configured to detect the presence of an inspected, finished part that is received to the loading structure. The detection apparatus also sends electronic signals to the processor. Also provided is a restraining apparatus controlled by an electronic signal sent from the processor. The restraining apparatus selectively locks the loading structure into a loading position and unlocks it to allow its removal from the loading position.

Another aspect of the invention provides an inspection and verification system that comprises a loading structure for receiving a finished part, and a processor capable of at least accessing finished part information and receiving and sending electronic signals. The system further comprises an inspection fixture having at least a sensor for detecting the presence of required components on the finished part. The inspection fixture sends a component signal to the processor based on the number of components detected. An electronic scale is also provided for weighing the inspected, finished part after it is received to the loading structure. The scale also sends a weight signal to the processor based on the weight of the inspected, finished part. The system also includes a restraining apparatus controlled by an electronic signal sent from the processor. The restraining apparatus selectively locks the loading structure into a loading position and unlocks it to allow its removal from the loading position.

A further aspect of the invention provides a method of inspection and verification that comprises locking a loading structure into a loading position for receiving a finished part. Next, a processor is programmed to at least selectively access finished part information and to receive and send electronic signals. The finished part is then inspected with an inspection fixture that sends a first signal to the processor based on the inspection. The processor automatically accesses finished part information that corresponds to the first signal, and then compares the information to the first signal. When the finished part information matches the first signal, the processor "passes" the finished part; the processor "fails" the finished part when the first signal does not match the finished part information. When the finished part "fails," it is quarantined. When the finished part "passes," it is received to the loading structure. A verification then takes place to determine whether the finished part was properly received to the loading structure. The verification is performed by a detection apparatus that sends a second signal to the processor. The processor then compares the second signal to corresponding finished part information it has accessed. The processor allows the inspection of additional finished parts when the comparison indicates that the finished part was properly received to the loading structure.

When the comparison indicates that the finished part was not properly received to the loading structure, the processor prohibits inspection of additional finished parts. The prohibition of the inspection of additional finished parts is overridden when a required manual user input is entered into the processor. The manual user input unlocks the loading structure, which is then removed and a new loading structure locked into the loading position. Inspection and verification of additional finished parts then takes place, with the processor automatically counting the number of finished parts properly received to the loading structure. When the count of finished parts properly received to the loading structure equals a standard loading structure shipping quantity, the processor unlocks the loading structure for shipment and a new loading structure is then locked in the loading position.

The above object and other objects, features, and advantages of the present invention are readily apparent from the following detailed description and best mode for carrying out the invention when taken in connection with the accompanying drawings.

DETAILED DESCRIPTION OF THE PREFERRED EMBODIMENT(S)

Figure 1:
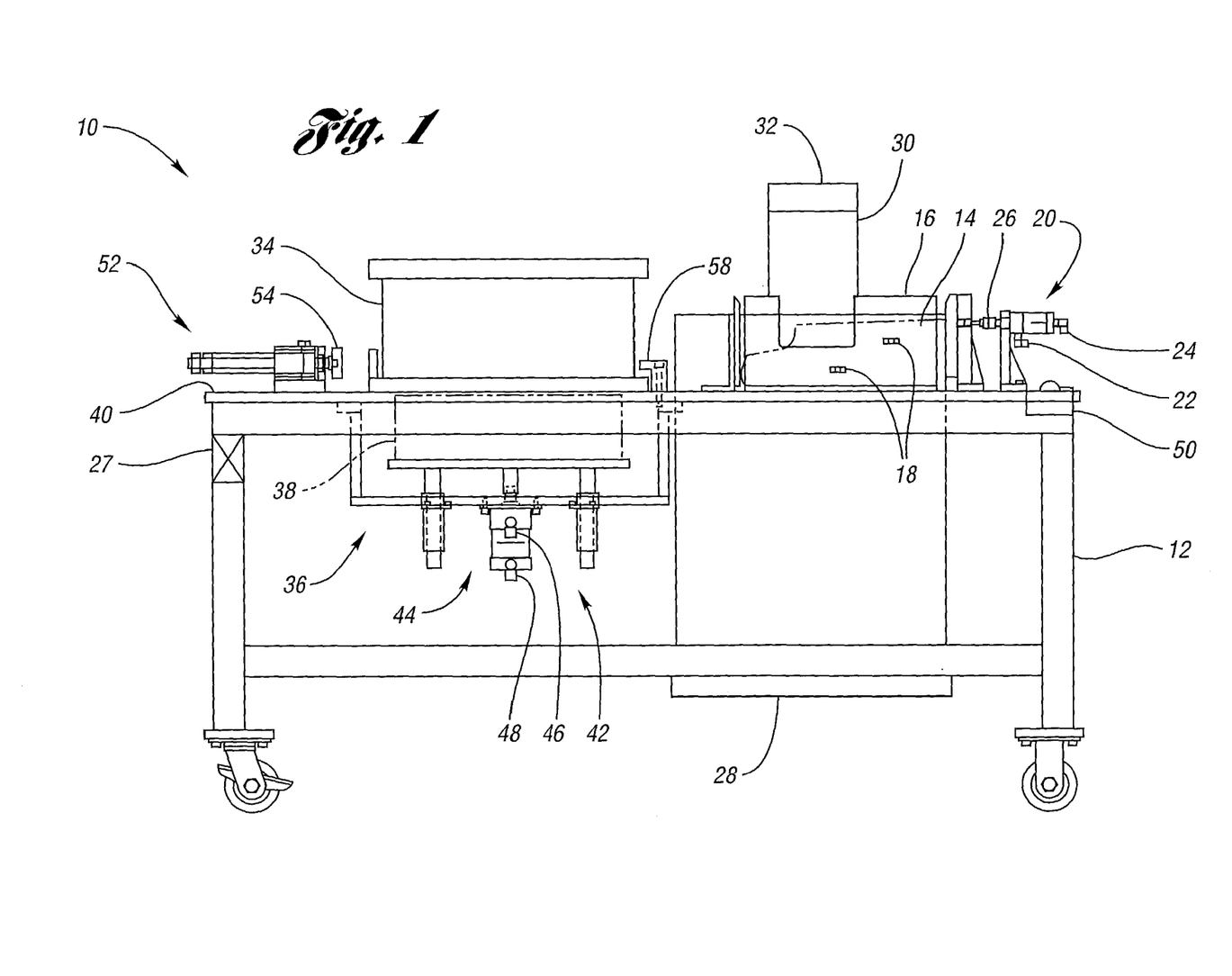
FIG. 1 is a front view of one embodiment of the inspection and verification system, including an inspection fixture, a marking device, a containment bin, a shipping container on an electronic scale, and a pneumatic cylinder with its plunger retracted.

Shown in FIG. 1 is a front view of an inspection and verification system 10 in accordance with the present invention. As shown here, the components of the system 10 are mounted on a mobile frame 12 to facilitate use of the system in different locations. A finished part 14, shown in phantom, is located in an inspection fixture 16 that is used to inspect the finished parts. The inspection fixture 16 has sensors 18 which can be used to detect the presence of the finished part 14 in the inspection fixture 16, or they can be used to detect the presence of components on the finished part 14 when the object of the inspection is to verify that the finished part 14 is completely assembled. As described more fully below, the inspection fixture 16 can be configured with various types of sensors 18 to perform a variety of inspection functions. A finished part marking device 20 is mounted to the mobile frame 12 close enough to the inspection fixture 16 that it can mark the finished part 14 after the inspection takes place.

Figure 2:
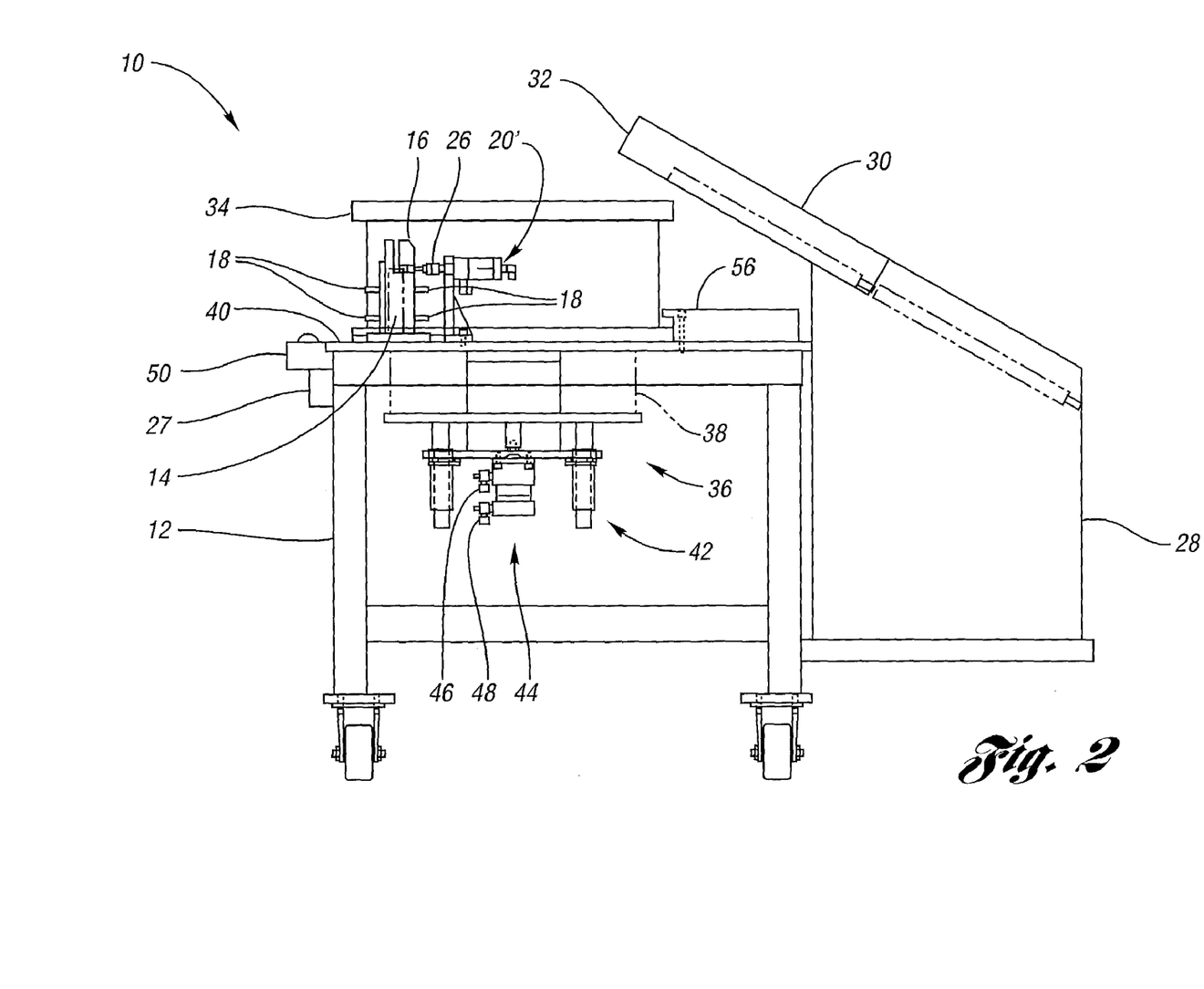
FIG. 2 is a side view the inspection and verification system of FIG. 1 with the marking device reoriented to the side of the inspection fixture.

The marking device 20 is an optional element of the inspection and verification system 10 that adds one more level of assurance that the finished part 14 has been properly inspected. Fittings 22 and 24 are located on the marking device 20 to allow the connection of air lines of the type commonly found in manufacturing facilities. Providing air to the marking device 20 facilitates extension and retraction of the marking head 26. The actual mark that is made on the finished part 14 can be a small indentation or a small spot of ink, depending on the particular finished part requirements. In FIG. 2, the inspection and verification system 10 is shown with a marking device 20' oriented to the side of the finished part 14. This merely illustrates the flexibility of the inspection and verification system 10, whose elements can be positioned at various locations on the moveable frame 12 to accommodate the needs of a particular finished part.

After the sensors 18 complete the inspection of a finished part, the inspection fixture 16 sends a signal to a processor 27 that indicates the results of the inspection. When it is merely the presence of the finished part that is being sensed by the sensors 18, the signal will tell the processor whether or not the finished part is properly detected. When the purpose of the inspection is to count the number of components on the finished part, the signal will indicate to the processor the number of components actually detected. The processor 27 is typically a programmable logic controller (PLC) of the type often used on manufacturing and inspection equipment. The PLC 27 is programmed to receive signals from, and send signals to, the various elements of the inspection and verification system 10. In addition, the PLC 27 also accesses certain finished part information, to aid in the inspection and verification of the finished parts. This information may include such items as part identifiers (typically part numbers), the weight of a particular finished part, or the quantity of finished parts required to fill a shipping container prior to shipment. This information can be programmed directly into the PLC 27 where it is accessible by the PLC 27 from its memory, or it can reside in a database stored on an external device, such as a computer, that is connected to the PLC 27.

The inspection and verification system 10 also includes a containment bin 28 that is used to quarantine finished parts that do not pass inspection. A chute 30 is provided with an opening 32 that allows one-way access to the containment bin 28. Finished parts that fail inspection are placed in the opening 32, travel down the chute 30 and into the containment bin 28, where they are only accessible by an individual having a key to open the containment bin 28. In this way, a finished part that fails inspection and has subsequently been quarantined, will not be mistakenly shipped to the customer.

It is possible to configure the inspection fixture 16 to inspect the finished parts in a number of different ways. In one configuration, merely detecting the presence of the finished part may be enough to qualify the part as having passed inspection. For example, a finished part may have two models, a right-hand model and a left-hand model. When the right-hand model is ordered by the customer, the inspection fixture 16 is configured with sensors 18 in specific locations such that they will only detect the finished part if it is a right-hand model. Thus, merely detecting the presence of the finished part ensures that it is the correct part.

Similarly, the sensors 18 can be located at other points in the inspection fixture 16 such that assembled components attached to the finished part are detected. In this type of inspection, the inspection fixture 16 sends a component signal to the PLC 27 indicating the number of components detected on the finished part. These are just two examples of the many ways that the inspection fixture 16 can be used to inspect the finished parts. Other possible configurations include providing the inspection fixture 16 with a laser or infrared sensor capable of measuring specific dimensions on the finished parts, or adding equipment such as cameras, that can inspect visual features such as the color of the finished parts.

An increasingly common method of inspecting finished parts is to scan a bar coded label on the finished part and verify that it is in fact the part ordered by the customer. This type of inspection is contemplated in the inspection and verification system 10; however, when used, it will often be a part of other inspections, such as those discussed above. The inspection fixture 16 may be configured with sensors 18 capable of scanning a bar coded part label on the finished parts. In this configuration, other sensors, or some other inspection equipment, may additionally be used to further ensure that the finished parts meet the customer's requirements. When the inspection fixture 16 is configured to scan the part label on a finished part, it sends a finished part identifier signal to the PLC 27 along with any other inspection information.

Next, the PLC 27 determines whether the finished part passes inspection. It does this by comparing the information it receives from the inspection fixture 16, to information it receives either from other components in the system, or information the PLC 27 itself accesses. For example, when the inspection fixture 16 sends a component signal to the PLC 27, indicating the number of detected components, the PLC 27 compares this signal to finished part information it accesses either from its memory, or from an external database. Similarly, when the inspection fixture 16 sends the finished part identifier signal to the PLC 27, the PLC 27 compares this signal to a second finished part identifier signal. The second finished part identifier signal is sent by a scanner after it scans a bar coded label on a shipping container 34.

Figure 3:
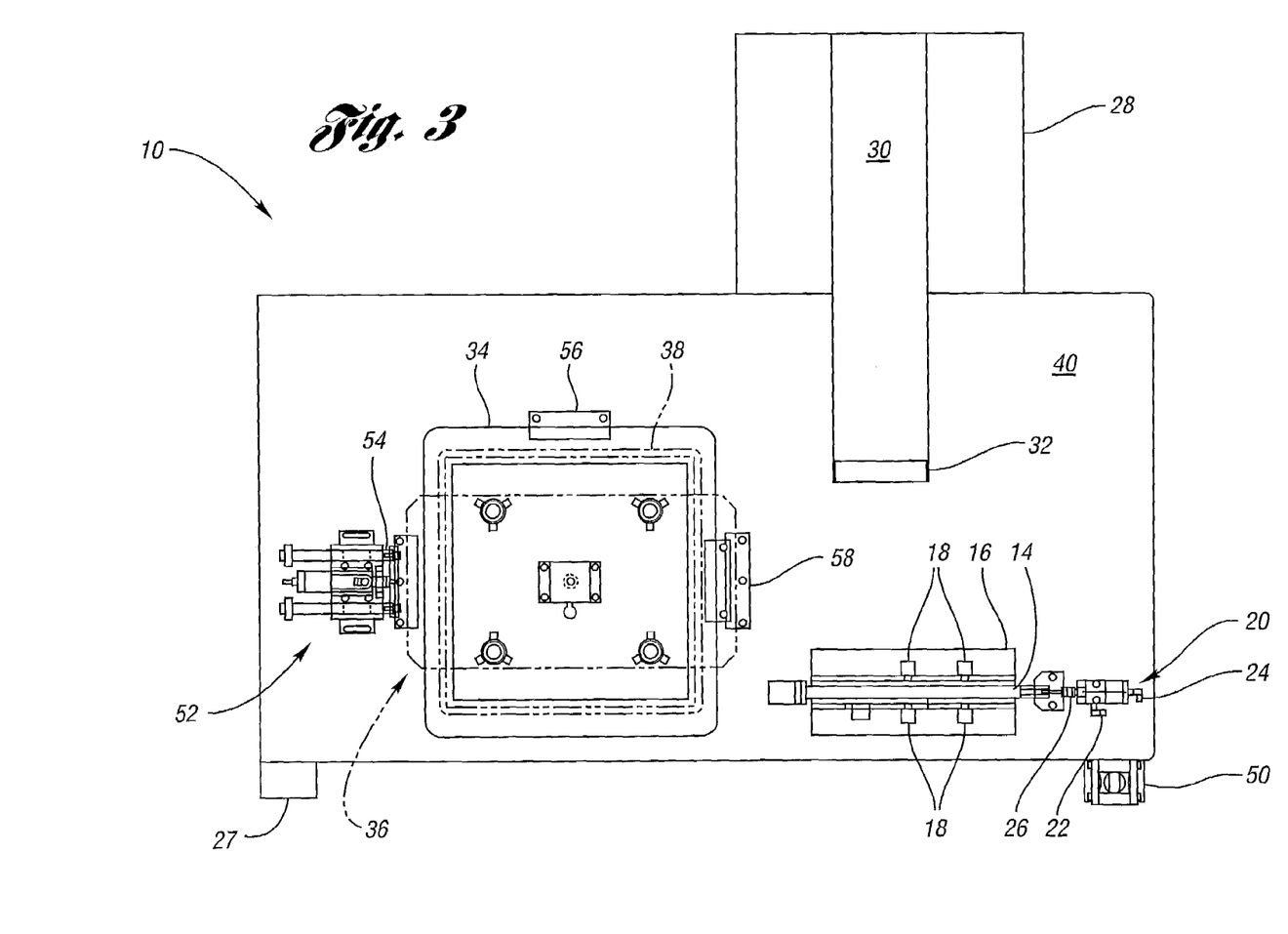
FIG. 3 is a top view of the inspection and verification system shown in FIG. 1, with the shipping container locked in the loading position by the pneumatic cylinder.

The shipping container 34, shown in FIGS. 1–3, is merely one type of loading structure that can be used with the inspection and verification system 10 of the present invention. When the finished parts are very large, the loading structure may not be a container at all, but may be a pallet or some other structure onto which the finished parts are placed after being inspected. As shown in FIGS. 1–3, the shipping container 34 is placed on a detection apparatus 36, which in this embodiment is an electronic scale capable of determining a tare weight so that it can weigh each finished part individually when it is placed in the shipping container 34. In this way, it is possible to verify that each finished part is properly received to the shipping container 34. The scale 36 is connected to the PLC 27 so that it can send a signal to the PLC 27 indicating the weight of the finished part.

The electronic scale 36 also has a weighing platform 38, shown in phantom in FIGS. 1 and 2, that normally resides below the top surface 40 of the mobile frame 12. The weighing platform 38 is thus positioned to allow for the repeated loading and unloading of the shipping container 34 without damage to the sensitive balance mechanism 42. After the finished part is placed into the shipping container 34, the weighing platform 38 is raised to a level above the top surface 40 of the mobile frame 12, such that contact is made with the shipping container 34 and the weight of the finished part is determined. In this embodiment, the scale 36 includes a pneumatic cylinder 44 that raises and lowers the weighing platform 38. Air lines (not shown), similar to those used on the marking device 20, are connected to air fittings 46, 48 to extend and retract the pneumatic cylinder 44.

After the scale 36 weighs the finished part, it sends a signal to the PLC 27 indicating this weight. The PLC 27 then compares this signal to the standard weight of the finished part, which it has accessed either from its memory or from an external database. If the standard part weight equals the weight of the finished part, the PLC 27 accepts the finished part and inspection of additional finished parts can occur. It is important to note that the word "equal" as used in this context, contemplates a range of acceptable weights. Thus, there is a weight tolerance used by the PLC 27 to "accept" a finished part having a weight close to, but not exactly equal to, the standard weight. When the weight of the finished part does not equal the weight of a standard finished part, the PLC 27 locks the system such that no additional inspections can take place. The system remains locked until the PLC 27 receives a manual user input, most often coming from a supervisor who is called to the inspection station when the PLC 27 places the system in the lock mode. The manual user input unlocks the shipping container 34 which is removed and quarantined so that all the finished parts already received to the shipping container 34 can be individually inspected. A new shipping container is then locked in the loading position and inspection of additional parts continues.

Normally, the signal from the scale 36 to the PLC 27 indicating the weight of the finished part is not sent until a next finished part is placed in the inspection fixture 16. However, a palm button 50 can be actuated by the operator so that the signal from the scale 36 is sent immediately. Use of the palm button 50 is optional except when the last finished part is loaded into the shipping container 34. Because there will be no additional finished parts placed in the inspection fixture 16, it is necessary to manually instruct the scale 36 to send the signal to the PLC 27. This is the function of the palm button 50.

Also attached to the frame 12 is a pneumatic cylinder 52, located in close proximity to the shipping container 34. When the shipping container 34 is first placed on the electronic scale 36, a small proximity switch (not shown) signals the PLC 27 that the shipping container 34 is in the loading position. The pneumatic cylinder 52 has a plunger 54 that retracts to accommodate placement of the shipping container 34 in the loading position on the scale 36, see FIG. 1. After the proximity switch detects the shipping container 34, the PLC 27 signals the pneumatic cylinder 52 to extend the plunger 54 which locks the shipping container 34 into the loading position. As best seen in FIGS. 1 and 2, brackets 56, 58 work in conjunction with the pneumatic cylinder 52 as a restraining apparatus to keep the shipping container 34 locked in the loading position, see FIG. 3. The PLC 27 counts each finished part that passes inspection and is accepted after being received to the shipping container 34. When this count indicates that the shipping container 34 is full, the PLC 27 signals the pneumatic cylinder 52 to retract the plunger 54 so that the shipping container 34, now full of inspected and verified finished parts, can be removed for shipment.

Figure 4:
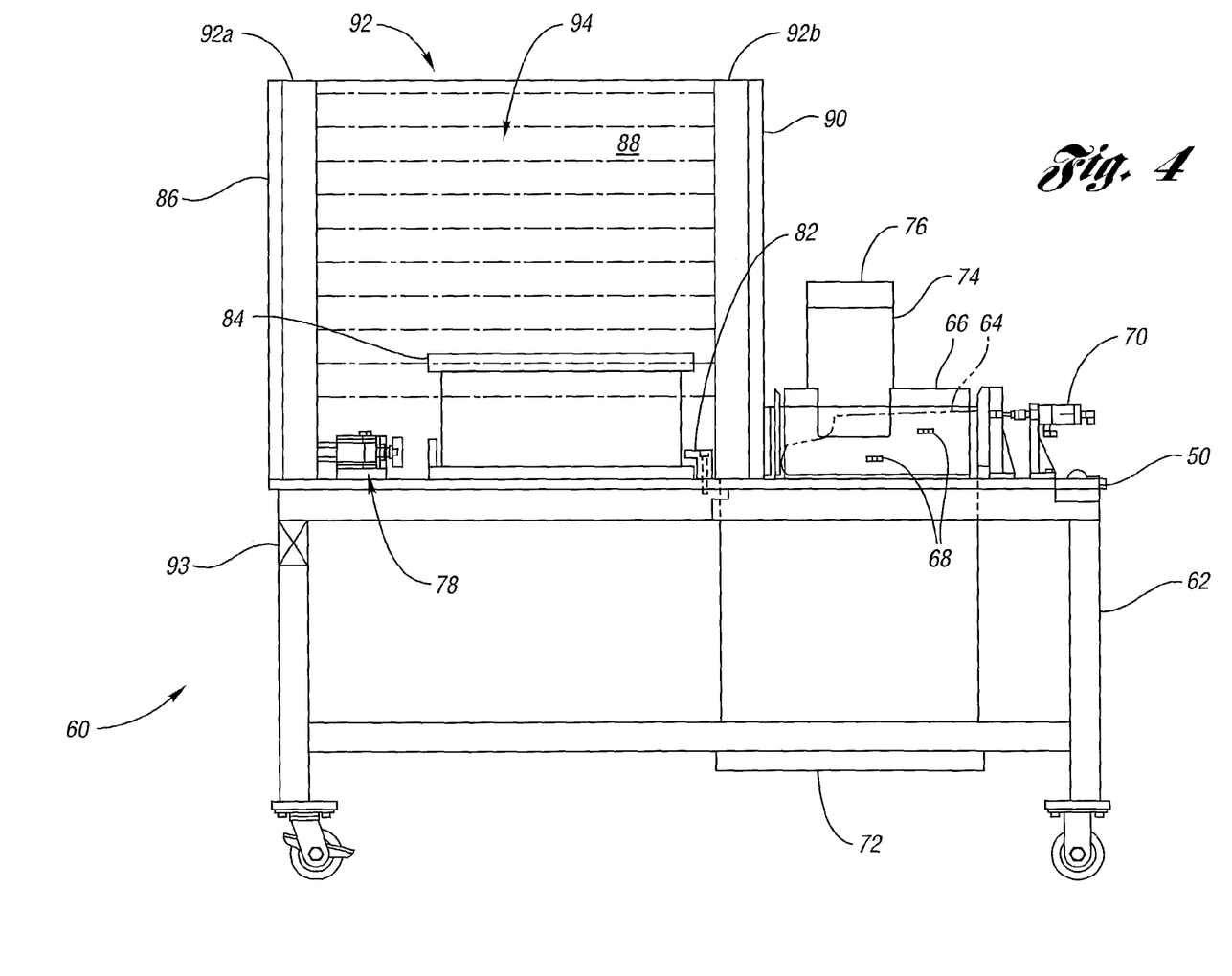
FIG. 4 is a front view of an alternative embodiment of the inspection and verification system, including an inspection fixture, a marking device, a containment bin, a shipping container, a pneumatic cylinder with its plunger retracted, and a light curtain limiting access to the shipping container.
Figure 5:
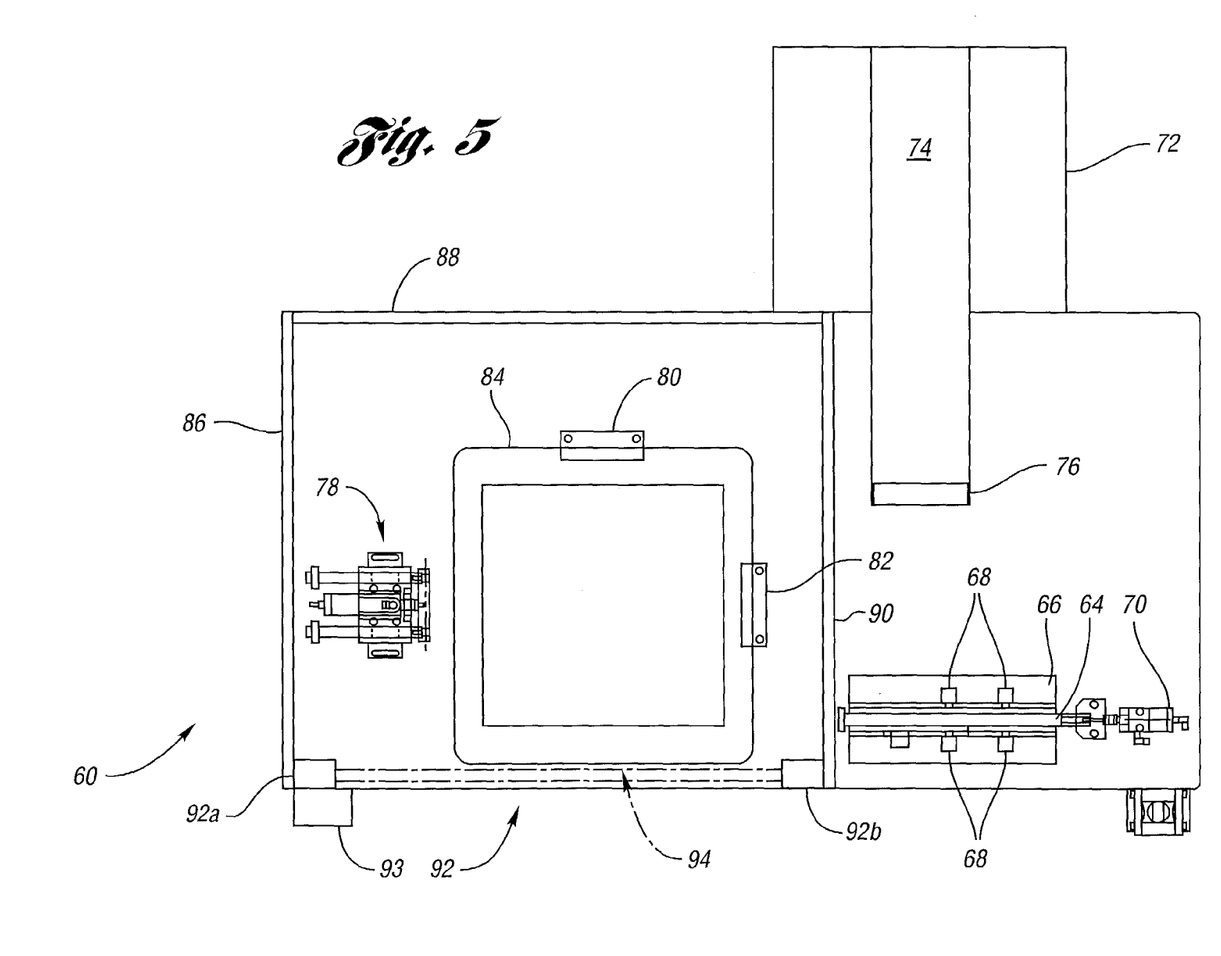
FIG. 5 is a top view of the inspection and verification system shown in FIG. 4.

FIGS. 4 and 5 show the front view and top view, respectively, of an inspection and verification system 60 in accordance with an alternative embodiment of the present invention. In this embodiment, many of the components are the same as in the preferred embodiment. A mobile frame 62 allows the system 60 to be used in different locations throughout a facility. A finished part 64, shown in phantom in FIG. 4, sits inside an inspection fixture 66 having sensors 68 that perform functions similar to the sensors 18 shown in FIGS. 1–3. A finished part marking device 70 is mounted on the mobile frame 62 in close proximity to the finished part 64. A containment bin 72 is accessible through a chute 74 having an opening 76, and is used to quarantine finished parts that do not pass inspection.

This embodiment also includes a pneumatic cylinder 78, that along with brackets 80, 82, keep the shipping container 84 locked in the loading position. The primary difference between this embodiment and the preferred embodiment is in the way the system verifies that finished parts are properly received to the shipping container 84. Walls 86, 88 and 90 are attached to the mobile frame 62 to limit access to the shipping container 84. Attached to the walls 86, 90 is a detection apparatus 92, comprised of a light curtain that includes two vertical members 92a and 92b. As with the other electronic elements of the inspection and verification system 60, the light curtain 92 is capable of at least sending electronic signals to a processor 93, which is typically a PLC of the type used in the preferred embodiment.

During the operation of the inspection and verification system 60, the light curtain 92 generates a lightbeam 94, shown as dashed lines in FIGS. 4 and 5, that creates a permeable barrier between the vertical members 92a and 92b. When an operator "breaks" the lightbeam 94, such as when a finished part is placed into the shipping container 84, a signal is sent to the PLC 93. If the finished part has just passed inspection in the inspection fixture 66, the PLC 93 will accept the finished part when it receives the signal from the light curtain 92. If however the PLC 93 has not passed a finished part, it will lock the system upon receiving the signal from the light curtain 92. This means that the only time the permeable barrier lightbeam 94 can be broken without the PLC 93 locking the system, is when a finished part has just passed inspection in the inspection fixture 66.

When the PLC 93 does lock the system after rejecting a finished part, no further inspection can take place until the PLC 93 receives a manual input, and again, this will usually be from a supervisor. The shipping container 84 is removed and quarantined, and the finished parts already received to the shipping container 84 can be individually inspected at a convenient time. A new shipping container is then locked in the loading position, and inspection of additional parts continues. Use of the light curtain 92 as an alternative for the electronic scale is indicated when the finished parts do not lend themselves to being weighed. For example, when the finished parts are too small to be accurately weighed, the inspection and verification system 60 is a practical alternative because it uses a light curtain, rather than a scale.

Figure 6A:
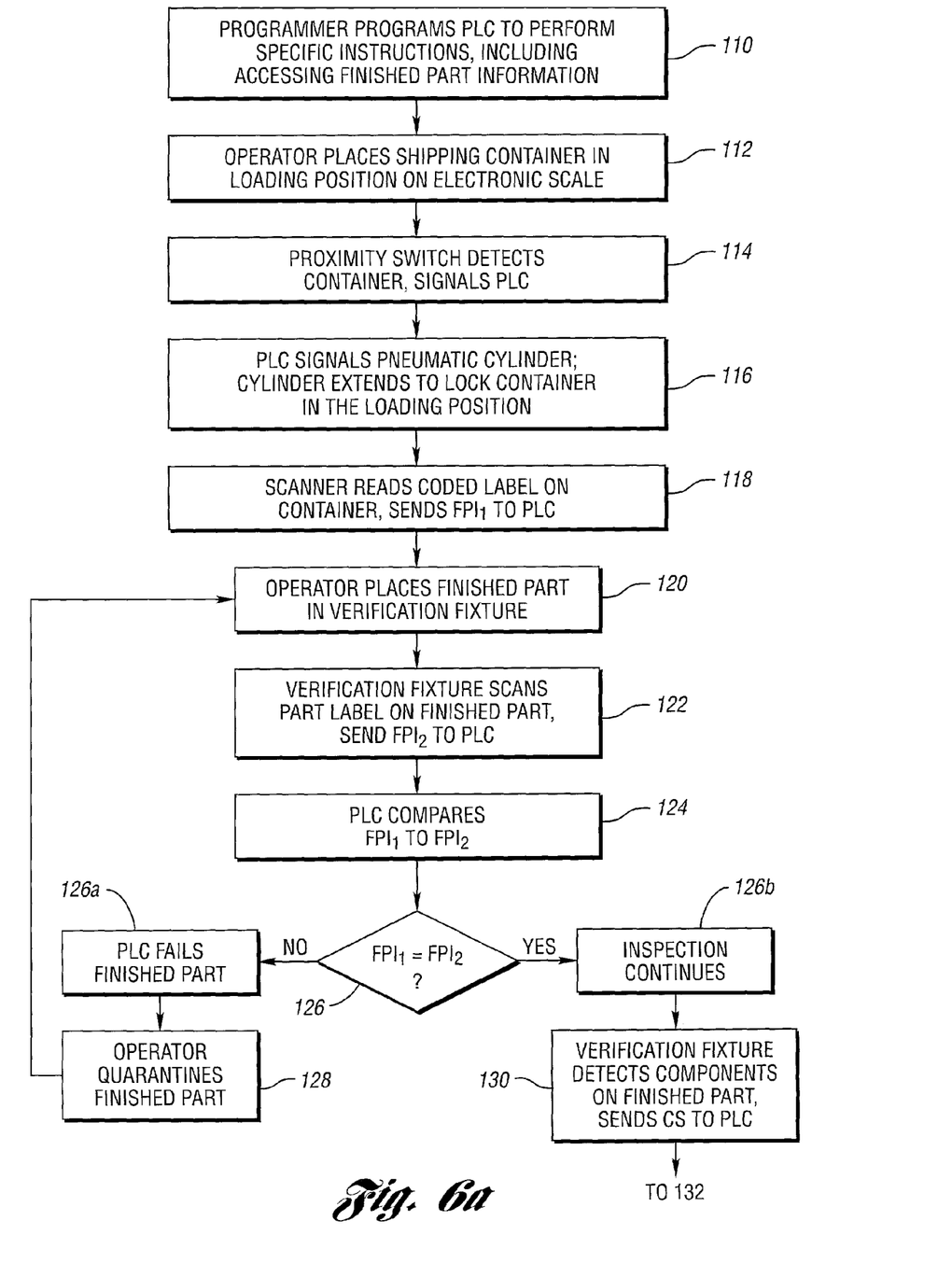
FIGS. 6a–6c show a flow chart that illustrates a method of inspection and verification according to one embodiment of the present invention.
Figure 6B:
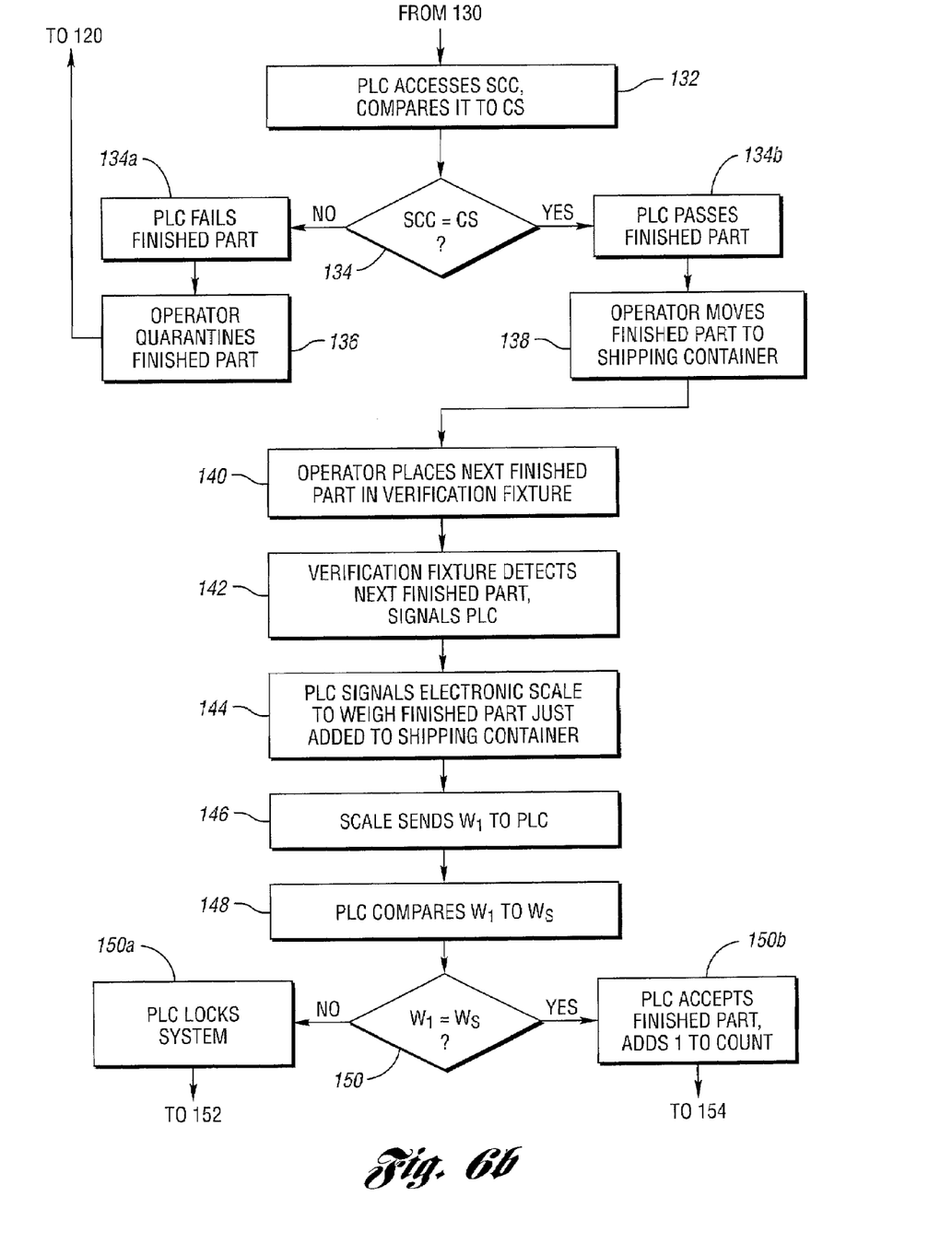
Figure 6C:
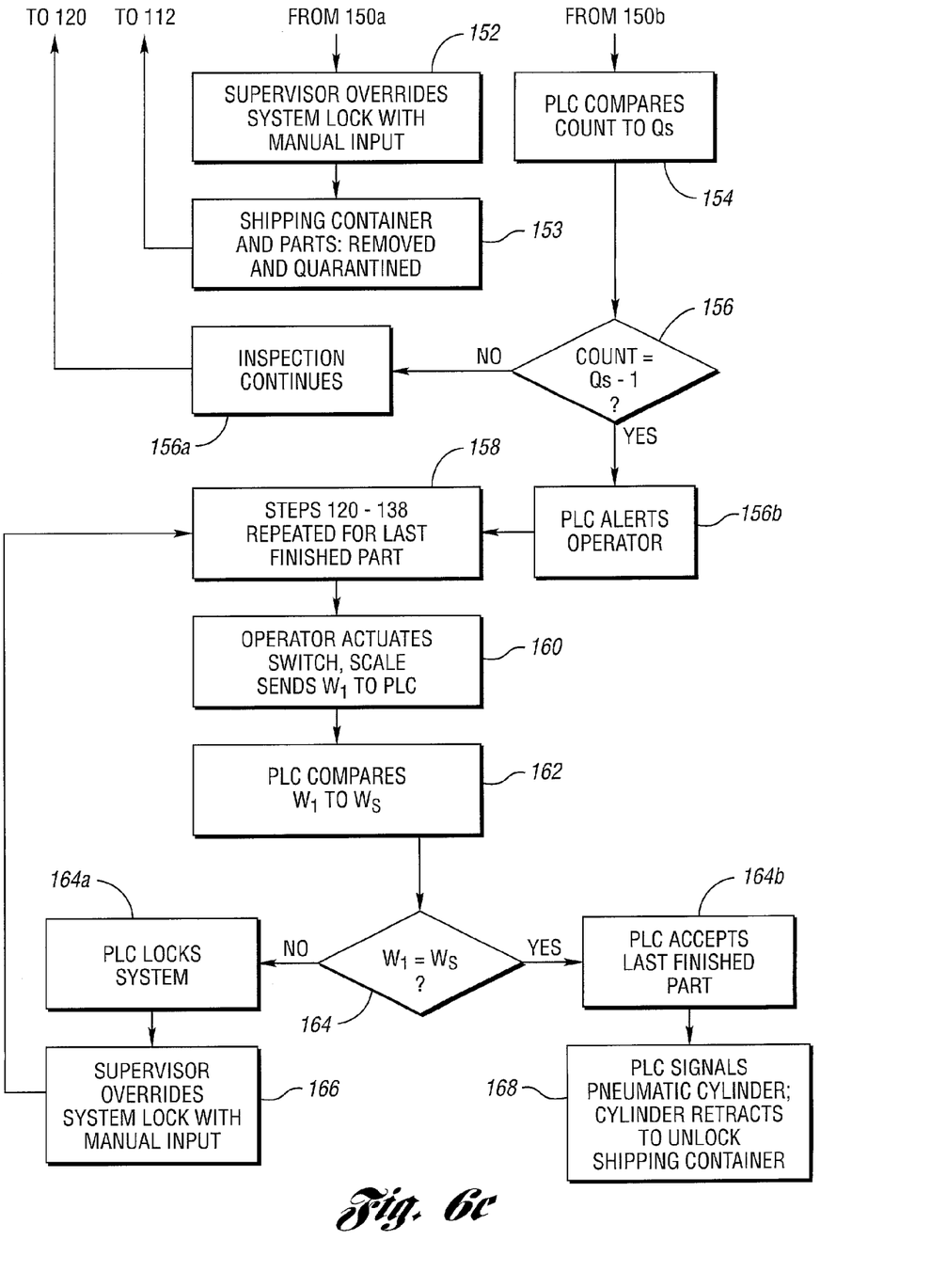

The present invention also includes a method of inspection and verification illustrated in the flow chart shown in FIGS. 6a–6c. FIGS. 1–3 are used to refer to particular devices used in the method. The method begins with the step of a programmer programming the PLC 27 to perform specific instructions, including processing signals received from system components, and accessing finished part information, as represented in block 110. As previously described, the program may include the finished part information itself, in which case the PLC 27 accesses the information from its own memory, or the finished part information may be accessed from a database that resides in an external device such as a computer. In the next step 112, the operator places the shipping container 34 in the loading position on the electronic scale 36. In step 114, a proximity switch detects the presence of the shipping container 34 and signals the PLC 27. In step 116, the PLC 27 signals the pneumatic cylinder 52 to extend the plunger 54 to lock the shipping container 34 in the loading position. Next, as represented in block 118, a scanner reads a bar coded label on the shipping container 34 and sends a first part identifier (FPI1) to the PLC 27.

The operator then places a finished part in the inspection fixture 16, as shown in block 120. As previously noted, a marking device 20 may be used to mark the finished part to indicate that it has been inspected with the inspection fixture 16. However, for many parts it may not be practicable to physically mark the finished part, so this optional step is omitted here. In step 122, the inspection fixture 16 scans a part label on the finished part and sends a second finished part identifier (FPI2) to the PLC 27. The PLC 27 then compares the two finished part identifiers to see if they match, represented here in block 124. In decision block 126, the PLC 27 decides whether the two part identifiers are equal. If they are not, the PLC 27 fails the finished part and quarantines it, see blocks 126a and 128. The operator then returns to step 120 and places another finished part in the inspection fixture 16 to have its label scanned and compared by the PLC 27 in steps 122–126.

When FPI1 equals FPI2, inspection continues as shown in block 126b. In step 130, the inspection fixture detects the presence of components on the finished part and sends a component signal (CS) to the PLC 27 indicating the number of components detected. In step 132, the PLC 27 accesses a standard component count (SCC) which is part of the accessible finished part information programmed in step 110. As with many of the steps, the PLC 27 "automatically" accesses the finished part information. As used here, "automatically" merely means that the processor is following instructions previously programmed, and that manual user input is not required. The SCC is the number of components that are required on a finished part that has been properly assembled. The PLC 27 then compares the standard component count to the component signal. In decision block 134, the PLC 27 decides whether the SCC equals the component count received in the component signal from the inspection fixture 16. It is worth noting that the component signal, CS, is not a number, but rather it is electronic information that the PLC 27 interprets as a number. Hence, the SCC never really "equals" the CS as shown in decision block 134, but it is a convenient shorthand that represents the actual process. When the SCC does not equal the component count received in the CS, the PLC 27 fails the finished part and the operator quarantines it, see blocks 134a, 136. This necessitates a return to step 120 so the operator can place another finished part in the inspection fixture.

When the SCC and the count received in the CS are equal, the PLC 27 passes the finished part, represented here in block 134b. In step 138 the operator moves the finished part to the shipping container 34. The next step 140, requires the operator to place the next finished part in the inspection fixture 16. The inspection fixture 16 then detects the presence of the next finished part and signals the PLC 27, represented here in block 142. The PLC 27 then signals the electronic scale 36 to weigh the finished part that was just added to the shipping container 34, represented here in block 144. In step 146, the electronic scale 36 sends a signal indicating the weight (W1) of the finished part to the PLC 27. The PLC 27 in step 148, compares the weight sent by the electronic scale 36 to a standard finished part weight (Ws) that it accesses from the accessible finished part information programmed in step 110. In decision block 150, the PLC 27 decides if W1 equals Ws. If the two weights are not equal, the PLC 27 locks the system so that no further inspection can take place, represented here in block 150a. As previously noted, the weights are considered "equal" in this context if their difference is within an accepted tolerance range. In order to unlock the system such that the PLC 27 will allow further inspection of finished parts, a supervisor overrides the system lock with a manual input to the PLC 27, represented here in block 152. The manual user input unlocks the shipping container 34 50 it can be removed and quarantined, represented in block 153, and all the finished parts already received to it can be individually inspected at some convenient time. This necessitates a return to step 112, so the operator can place another shipping container in the loading position. When W1 equals Ws, the PLC 27 accepts the finished part and adds one to the count of finished parts successfully inspected and verified; this step is represented here in block 150b.

In step 154, the PLC 27 compares the count of accepted parts to a standard shipping quantity (Qs). In decision block 156, the PLC 27 decides whether the count is equal to one less than the shipping quantity. When the count is not equal to one less then the shipping quantity, inspection continues. As indicated in step 156a, the operator returns to step 120 and places another finished part in the verification fixture. When the decision by the PLC 27 indicates that the count of accepted finished parts is equal to one less then the shipping quantity, the PLC 27 alerts the operator, represented here in block 156b. Step 158 requires the operator to perform steps 120–138 on the last finished part. Because no additional parts are to be placed in the shipping container 34 after the count of accepted parts equals the standard shipping quantity, the operator must manually activate the electronic scale 36 by pushing the palm button 50. This forces the electronic scale 36 to weigh the last finished part and send a weight signal to the PLC 27. This step is represented here in block 160. In step 162, the PLC 27 compares the weight signal to the standard finished part weight, and decides in step 164 if those weights are equal. If they are not, the PLC 27 locks the system such that no further inspection can take place until a supervisor overrides the system lock with a manual input to the PLC 27, see blocks 164a and 166. If the weight signal received from the electronic scale 36 equals the standard part weight, the PLC 27 accepts the last finished part, represented here in block 164b. Finally, in step 168, the PLC 27 signals the pneumatic cylinder 52 to retract the plunger 54 so the shipping container 34 can be removed from the loading position and prepared for shipment to the customer.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. An inspection and verification system, comprising:
   a loading structure having a coded label thereon, and configured to receive a finished part;
   a processor capable of at least accessing finished part information and receiving and sending electronic signals;
   a scanner for scanning the coded label and sending at least one electronic signal to the processor, including a first finished part identifier signal based on information scanned from the coded label;
   an inspection fixture having at least a sensor for inspecting the finished part prior to the loading structure receiving the part, and capable of sending electronic signals to the processor after the part is inspected;
   a detection apparatus configured to detect the presence of an inspected, finished part received to the loading structure and capable of sending an electronic signal to the processor when the inspected, finished part is received; and
   a restraining apparatus controlled by an electronic signal sent from the processor for selectively locking the loading structure into a loading position such that removal of the loading structure from the loading position is inhibited, and unlocking the loading structure to allow removal of the loading structure from the loading position.

2. The inspection and verification system of claim 1, wherein the inspection fixture scans a part label on the finished part, and sends a second finished part identifier signal to the processor based on information scanned from the part label.

3. The inspection and verification system of claim 2, wherein the processor compares the first finished part identifier signal to the second finished part identifier signal and "fails" the finished part when the two finished part identifier signals are not the same.

4. The inspection and verification system of claim 1, wherein the inspection fixture detects the presence of required components on the finished part, and sends a component signal to the processor based on the number of components detected.

5. The inspection and verification system of claim 4, wherein the processor accesses a standard component count for the finished part and compares this to the component signal received from the inspection fixture, and the processor "passes" the finished part when the component signal matches the standard component count, and "fails" the finished part when it does not.

6. The inspection and verification system of claim 5, further comprising a containment bin for quarantining the finished part when the processor "fails" it.

7. The inspection and verification system of claim 5, wherein the detection apparatus comprises a light curtain including a light beam disposed adjacent to the loading structure which sends a light curtain signal to the processor when the beam is broken.

8. The inspection and verification system of claim 7, wherein the processor accepts the finished part when it receives the light curtain signal after it "passes" the finished part, and rejects the finished part when it receives the light curtain signal after it "fails" the finished part.

9. The inspection and verification system of claim 1, wherein the detection apparatus comprises an electronic scale for weighing the finished part after it is received to the loading structure, and for sending a weight signal to the processor based on the finished part weight.

10. The inspection and verification system of claim 9, wherein the processor accesses a standard part weight for the finished part, and compares this to the weight signal received from the detection apparatus, the processor accepts the finished part when the weight signal matches the standard part weight, and rejects the finished part when it does not.

11. The inspection and verification system of claim 10, wherein the processor locks the system after the processor rejects the finished part, the system remaining locked until a manual user input unlocks the system.

12. The inspection and verification system of claim 10, wherein the electronic scale sends the weight signal to the processor when a next finished part is placed in the inspection fixture.

13. The inspection and verification system of claim 10, wherein the electronic scale sends the weight signal to the processor when an operator actuates a manual switch.

14. The inspection and verification system of claim 10, wherein the processor accesses a standard loading structure shipping quantity for the finished part, maintains a count of the number of finished parts it accepts, and signals the restraining apparatus to unlock the loading structure when the count equals the standard loading structure shipping quantity.

15. A method of inspection and verification, comprising:
  locking a loading structure into a loading position for receiving a finished part such that removal of the loading structure from the loading position is inhibited, the loading structure having a coded label thereon;
  programming a processor to at least selectively access finished part information and to receive and send electronic signals;
  scanning the coded label on the loading structure and sending a first finished part identifier signal to the processor, based on information scanned from the coded label;
  inspecting the finished part with an inspection fixture that sends a first signal to the processor based on the inspection;
  automatically accessing, with the processor, finished part information that corresponds to the first signal;
  automatically comparing, with the processor, the first signal to the corresponding finished part information, and "passing" the finished part when the first signal matches the corresponding finished part information and "failing" the finished part when it does not;
  quarantining the finished part when the processor "fails" the finished part;
  receiving the finished part to the loading structure when the processor "passes" the finished part;
  verifying whether the finished part was properly received to the loading structure using a detection apparatus that sends a second signal to the processor;
  allowing inspection of additional finished parts when the processor, based on a comparison of the second signal to accessed finished part information, indicates that the finished part was properly received to the loading structure;
  automatically prohibiting, with the processor, inspection of additional finished parts when the processor, based on a comparison of the second signal to accessed finished part information, indicates that the finished part was not properly received to the loading structure;
  allowing inspection of additional finished parts when a required manual user input unlocks the loading structure for removal of the loading structure and finished parts received to the loading structure, and a new loading structure is locked into the loading position;
  inspecting and verifying additional finished parts;
  automatically counting, with the processor, the number of finished parts properly received to the loading structure; and
  automatically unlocking the loading structure for shipment and locking a new loading structure in the loading position when the count of finished parts properly received to the loading structure equals a standard loading structure shipping quantity.

16. The method of inspection and verification of claim 15, wherein inspecting the finished part with an inspection fixture comprises scanning a part label on the finished part and sending a second finished part identifier signal to the processor, based on information scanned from the part label.

17. The method of inspection and verification of claim 16, further comprising comparing, with the processor, the two finished part identifier signals and "failing" the finished part when the two finished part identifier signals are not the same.

18. The method of inspection and verification of claim 15, wherein inspecting the finished part with the inspection fixture comprises detecting the presence of required components on the finished part, and sending a component signal to the processor.

19. The method of inspection and verification of claim 18, wherein automatically comparing the first signal to the corresponding finished part information comprises comparing the component signal to an accessed standard component count.

20. The method of inspection and verification of claim 15, further comprising programming the processor to access a standard finished part weight for the finished part.

21. The method of inspection and verification of claim 20, wherein verifying whether the finished part was properly received to the loading structure comprises weighing the finished part with an electronic scale and sending a weight signal to the processor, which compares it to an accessed standard part weight.

22. An inspection and verification system, comprising:
  a loading structure for receiving a finished part;
  a processor capable of at least accessing finished part information and receiving and sending electronic signals;
  an inspection fixture having at least a sensor for inspecting the finished part prior to the loading structure receiving the part, and capable of sending electronic signals to the processor after the part is inspected, the inspection fixture being configured to detect the presence of required components on the finished part, and to send a component signal to the processor based on the number of components detected;
  a detection apparatus configured to detect the presence of an inspected, finished part received to the loading structure and capable of sending an electronic signal to the processor when the inspected, finished part is received; and
  a restraining apparatus controlled by an electronic signal sent from the processor for selectively locking the loading structure into a loading position, and unlocking the loading structure to allow removal of the loading structure from the loading position, the restraining apparatus including a pneumatic cylinder extendable to lock the loading structure in the loading position, and retractable to unlock the loading structure.

23. The inspection and verification system of claim 22, wherein the restraining apparatus includes a pneumatic cylinder extendable to lock the loading structure in the loading position, and retractable to unlock the loading structure.

24. The inspection and verification system of claim 23, further comprising a coded label on the loading structure and a scanner for scanning the coded label and sending at least one electronic signal to the processor, including a first finished part identifier signal based on information scanned from the coded label.

* * * * *